(12) United States Patent
Zhang et al.

(10) Patent No.: US 12,380,723 B2
(45) Date of Patent: Aug. 5, 2025

(54) PERSON RE-IDENTIFICATION METHOD OF INTEGRATING GLOBAL FEATURES AND LADDER-SHAPED LOCAL FEATURES AND DEVICE THEREOF

(71) Applicant: NANJING UNIVERSITY OF POSTS AND TELECOMMUNICATIONS, Nanjing (CN)

(72) Inventors: Dengyin Zhang, Nanjing (CN); Jingyu Wang, Nanjing (CN); Qian Zhao, Nanjing (CN)

( * ) Notice: Subject to any disclaimer, the term of this patent is extended or adjusted under 35 U.S.C. 154(b) by 421 days.

(21) Appl. No.: 18/094,880

(22) Filed: Jan. 9, 2023

(65) Prior Publication Data
US 2023/0162522 A1   May 25, 2023

Related U.S. Application Data

(63) Continuation of application No. PCT/CN2022/133947, filed on Nov. 24, 2022.

(30) Foreign Application Priority Data

Jul. 29, 2022   (CN) .......................... 202210906148.6

(51) Int. Cl.
  *G06V 10/42* (2022.01)
  *G06V 10/44* (2022.01)
  *G06V 40/10* (2022.01)

(52) U.S. Cl.
  CPC .............. *G06V 40/10* (2022.01); *G06V 10/42* (2022.01); *G06V 10/454* (2022.01)

(58) Field of Classification Search
  CPC ...... G06V 40/10; G06V 10/42; G06V 10/454; G06V 10/761; G06V 20/52; G06V 10/82; G06N 3/0464; G06N 3/084; G06N 3/0985
  See application file for complete search history.

(56) References Cited

FOREIGN PATENT DOCUMENTS

| CN | 112906679 A | 6/2021 |
| CN | 114550220 A | 5/2022 |
| CN | 115082966 A | 9/2022 |

OTHER PUBLICATIONS

Wu, Shaojun, and Ling Gao. "Multi-level joint feature learning for person re-identification." Algorithms 13.5 (2020): 111. (Year: 2020).*

(Continued)

*Primary Examiner* — Amandeep Saini
*Assistant Examiner* — Denise G Alfonso (57) ABSTRACT

The present disclosure discloses a person re-identification method of integrating global features and ladder-shaped local features and a device thereof, comprising: extracting the image to be identified and the image-library image by using a pre-trained person re-identification network model, respectively, to obtain the person feature of the image to be identified and the person feature of the image-library image; matching the similarity between the person feature of the image to be identified and the person feature of the image-library image, and outputting the person images with the top N similarity as the person re-identification result; wherein a person re-identification network comprises a backbone network, an improved global feature branch and a ladder-shaped local feature extraction branch guided by a block weight; using a public data set to train the person re-identification network, and obtaining the trained person re-identification network model.

10 Claims, 4 Drawing Sheets

(56) References Cited

OTHER PUBLICATIONS

Liu, Xihui, et al. "Hydraplus-net: Attentive deep features for pedestrian analysis." Proceedings of the IEEE international conference on computer vision. 2017. (Year: 2017).*

* cited by examiner

PERSON RE-IDENTIFICATION METHOD OF INTEGRATING GLOBAL FEATURES AND LADDER-SHAPED LOCAL FEATURES AND DEVICE THEREOF

CROSS-REFERENCE TO RELATED APPLICATIONS

The application claims priority to Chinese patent application No. 202210906148.6, filed on Jul. 29, 2022, the entire contents of which are incorporated herein by reference.

TECHNICAL FIELD

The present disclosure belongs to the technical field of digital image processing, and relates to a person re-identification method of integrating global features and ladder-shaped local features and a device thereof, in particular to a person re-identification method of integrating global features and ladder-shaped local features guided by a block weight.

BACKGROUND

Person re-identification is a cross-camera image retrieval problem, which aims to retrieve the images of persons belonging to the same identity from the image database by using a query graph. First, the original person video images are extracted from a plurality of cameras, and other images of the person are confirmed by feature extraction and similarity measurement in turn.

At present, due to the influence of camera angle, weather and other factors, the quality of the obtained original video image is not high. Shaped and blurred images will seriously affect the accuracy of person re-identification, so that learning a high-accuracy person re-identification model from low-quality images becomes the research focus.

According to the type of loss, person re-identification can be divided into characterization learning and measurement learning. Characterization learning regards person re-identification as an image classification and verification problem, while measurement learning maps image features to high-dimensional feature space, and measures the similarity of two images by distance. Since 2014, the more robust features extracted by a convolution neural network and a simpler distance measurement formula have been used to find more accurate person images, which has greatly enhanced the accuracy and generalization ability of the person re-identification model. In this research direction, a large number of scholars put forward higher-quality algorithms, and the research on person re-identification ushers in explosive growth.

However, in the real scene, the same person with different cameras often shows great differences in appearance due to various factors such as illumination, posture, shading and resolution, which brings many challenges to the research and application of person re-identification. Therefore, how to extract more discriminating person features and use an efficient similarity measurement method to reduce the intra-class gap and increase the inter-class gap has become the key issue of person re-identification.

SUMMARY

Objective: In order to overcome the shortcomings in the prior art, the present disclosure provides a person re-identification method of integrating global features and ladder-shaped local features and a device thereof. Based on the integration of global features and ladder-shaped local features guided by a block weight, while the person re-identification effect is obviously improved, not too much computation will occur. At the same time, the present disclosure can solve the problem of low accuracy of a person re-identification research algorithm resulted from image shading, change of shooting angle, low resolution and other phenomena.

Technical scheme: in order to solve the above technical problem, the technical scheme used by the present disclosure is as follows.

In a first aspect, a person re-identification method is provided, comprising:

acquiring an image to be identified and a image-library image;

extracting the image to be identified and the image-library image by using a pre-trained person re-identification network model, respectively, to obtain the person feature of the image to be identified and the person feature of the image-library image;

matching the similarity between the person feature of the image to be identified and the person feature of the image-library image, and outputting the person images with the top N similarity as the person re-identification result;

wherein the method for constructing the person re-identification network model comprises:

constructing a person re-identification network, which comprises a backbone network, an improved global feature branch and a ladder-shaped local feature extraction branch guided by a block weight; wherein the backbone network is Resnet50, and a pre-training weight is loaded; the improved global feature branch is connected to the backbone network Conv5_x, comprises a channel attention module, a multi-receptive field integrating module, a Generalized Mean (GeM) pooling layer and a fully connected layer, and is configured to extract the person global feature; after being connected to the backbone network Conv4_x, the ladder-shaped local feature extraction branch guided by the block weight comprises a ladder block layer, a pooling layer, a spatial attention module and a fully connected layer, and is configured to extract the person local feature; the person global feature and the person local feature are connected as the final person features;

using a public data set to train the person re-identification network, and obtaining the trained person re-identification network model.

In some embodiments, the method of constructing the improved global feature branch comprises:

taking the feature map obtained from the backbone network Conv5_x as input, first, extracting significant person information by the channel attention module, then, acquiring the feature information of persons under different receptive fields by the multi-receptive field integrating module for integration, and then performing GeM pooling by a GeM pooling layer to obtain the 2048-dimensional feature vector, using the triplet loss with hard sample mining constraint, and at the same time, connecting the feature vector to the fully connected layer for dimension reduction to obtain the 512-dimensional global feature, using a cross-entropy loss constraint, and using the triple loss and the cross-entropy loss for joint optimization training.

Further, in the channel attention module, the input feature map uses maximum pooling and average pooling at the same time to obtain two one-dimensional vectors, the one-dimensional vectors are then sent to a multi-layer perceptron with shared weights, and the outputs are added element by element and then are activated by Sigmoid to obtain corresponding attention weights;

the formula of the GeM pooling layer is:

$$f = [f_1 \ldots f_k \ldots f_K]^T, f_k = \left(\frac{1}{|X_k|}\sum_{x \in X_k} x^{p_k}\right)^{\frac{1}{p_k}}$$

where X is the input of the GeM pooling layer, f is the output of the GeM pooling layer, and $p_k$ is a hyper-parameter, which is learned in the process of back propagation;

the multi-receptive field integrating module comprises three branches, convolution operation is performed on the input feature X by branches with the convolution kernel size of 3×3 and the dilation rate of 1, 2 and 3, respectively, to obtain three feature maps, and the three feature maps are integrated into the final output $X^1$.

In some embodiments, the method of constructing the ladder-shaped local feature extraction branch guided by the block weight comprises:

taking the feature map obtained through the backbone network Conv4_x as input, obtaining nine local feature maps through a ladder block layer, performing pooling operation on nine local feature maps to obtain nine 1024-dimensional feature vectors, and then obtaining nine 256-dimensional feature vectors through dimension reduction through the first fully connected layer, and using the cross-entropy loss for classification learning after sending all feature vectors reduced to 256 dimensions to a second fully connected layer, respectively;

at the same time, taking the feature map obtained by the backbone network Conv4_x as input, and obtaining nine spatial attention weight blocks after the spatial attention module and the ladder block layer, where a block weight is computed for each block and the block weight is used to guide the cross-entropy loss.

Further, the ladder block layer first divides the original complete person image feature into 12 horizontal blocks evenly, a first block is used as the initial block, every four blocks are used as a whole as a local area, the initial block is then changed downward with a step size of 1 for ladder-shaped blocking, and finally nine local feature maps are obtained.

For the spatial attention module, first, in the channel attention module, the input H×W×C features are subjected to maximum pooling and average pooling of one channel dimension to obtain two channel descriptions of H×W×1, and the two channel descriptions are spliced together according to the channel; thereafter, through a 7×7 convolution layer, the activation function is Sigmoid, and the spatial attention weight coefficient of H×W×1 is obtained;

the block weight calculation method comprises: sending the spatial attention weight coefficient of H×W×1 output by the spatial attention module into a ladder block layer to obtain nine local coefficient blocks, and dividing the coefficient sum of each local coefficient block by the coefficient sum of nine coefficient blocks to obtain nine block weights.

In some embodiments, the person re-identification network model is trained using double-branch joint training, and the joint training loss function is $L_{total}=L_{global}+L_{local}$, where $L_{global}$ represents the improved global feature branch loss, and $L_{local}$ represents the ladder-shaped local feature branch loss guided by the block weight.

Further, the improved global feature branch loss is $L_{global}=L_{Softmax}+L_{tri\_hard}$, where $L_{Softmax}$ is the cross-entropy loss, and $L_{tri\_hard}$ is the triplet loss with hard sample mining, $$L_{Softmax} = -\sum_{i=1}^{N} \lg \frac{\exp(W_{y_i}^T f_i + b_{y_i})}{\sum_{k=1}^{H} \exp(W_k^T f_i + b_k)}$$

where N is the number of batches. H is the number of persons, fi is the feature vector of image i, the real label thereof is $y_i$, W is the weight, and b is the offset; $W_k^T$ is the transposition of the weight vector of the kth person, and bk is the offset vector of the kth person;

$$L_{tri\_hard} = \frac{1}{P \times K} \sum_{a \in batch} \left(\max_{pos \in A} d_{an,pos} - \min_{neg \in B} d_{an,neg} d_{an,neg} + mar\right)_+$$

the triplet loss with hard sample mining is used for training, the triple loss function selects an anchor point an, a positive sample pos and a negative sample neg to form a triple, during training, each batch contains P persons, each person has K images, all triples are from P×K images, and the triple loss is calculated by calculating the Euclidean distance to find the positive sample farthest from the anchor point and the negative sample closest to the anchor point, where mar is the set hyper-parameter, $d_{an,pos}$ is the distance between the anchor point and the positive sample, $d_{an,neg}$ is the distance between the anchor point and the negative sample, A and B represent different sample sets in the P×K images, that is, the positive sample and the negative sample which are selected do not coincide; and minimizing the loss function means maximizing the distance between the anchor point and the negative sample and minimizing the distance between the anchor point and the positive sample.

Further, the ladder-shaped local feature branch loss guided by the block weight is as follows:

$$L_{local}=\Sigma_{i=1}^{n} W_i L_{Softmax\_i}$$

where n is the number of local feature blocks, $L_{Softmax\_i}$ represents the cross-entropy loss of the ith local feature map, and $W_i$ is the block weight of the ith local feature map.

In a second aspect, the present disclosure provides a person re-identification device, comprising a processor and a storage medium;

wherein the storage medium is configured to store instructions;

the processor is configured to operate according to the instructions to perform the steps of the method according to the first aspect.

In a third aspect, the present disclosure provides a storage medium on which a computer program is stored, wherein the computer program, when executed by a processor, implements the steps of the method according to the first aspect.

The goal of the present disclosure is to learn more robust person feature representation, so as to cope with complex person re-identification scenes and achieve a good identification effect. The present disclosure designs a person re-identification method of integrating global features and ladder-shaped local features. In this method, resnet50 is used as the backbone network to extract the features of person pictures, and then two branches are connected, namely the global feature branch and the ladder-shaped local feature branch guided by the block weight. The global branch introduces the channel attention module to extract more significant information from the feature map; and then the multi-receptive field integrating module is connected, which fully acquires person context information in the manner of feature extraction and integration of the same input by different receptive fields. Local branch introduces ladder block layer. This module divides the feature map horizontally in a ladder type. The module can extract more detailed person information. At the same time, the cross-entropy loss is guided by calculating the block weight, so that the trained model pays more attention to important person information. Finally, the model is trained by the strategy of double-branch joint training.

Advantageous effects: a person re-identification method of integrating global features and ladder-shaped local features and a device thereof provided by the present disclosure have the following advantages.

(1) The present disclosure proposes a person re-identification method of integrating global features and ladder-shaped local features guided by the block weight, which improves the accuracy of person re-identification. First, Resnet50 network is used as the backbone network to extract the global features of person images; and then the global features are sent to the designed branch network to extract global features and local features, respectively. Finally, the features of the two branches are integrated. The obtained features not only contain more abstract global features, but also contain local features with more detailed information. Therefore, the present disclosure is more robust.

(2) The present disclosure uses generalized mean pooling as an aggregation module. The pooling is between maximum pooling and mean pooling. Through a unified pooling type, the feature difference can be better captured.

(3) The multi-receptive field integrating module can effectively aggregate the features of different receptive fields, and further improve the person re-identification performance.

(4) The ladder block layer divides the image area step by step, so as to strengthen the connection between local features and avoid the loss of some important information in the process of feature learning.

(5) The designed block weight is used to guide the cross-entropy loss of local branches, so that the model training process pay more attention to the key information of the picture, and the trained model can better extract the key features.

DETAILED DESCRIPTION OF THE EMBODIMENTS

The present disclosure will be further described with reference to the following drawings and embodiments. The following embodiments are only used to illustrate the technical scheme of the present disclosure more clearly, rather than limit the scope of protection of the present disclosure.

In the description of the present disclosure, "several" meanings more than one, "a plurality of" meanings more than two, "greater than, less than, more than, etc." are understood as excluding the number itself, and "above, below, within, etc." are understood as including the number itself. If a first and a second are described, they are only used for the purpose of distinguishing technical features, but cannot be understood as indicating or implying relative importance, or implicitly indicating the number of indicated technical features or implicitly indicating the sequence of indicated technical features.

In the description of the present disclosure, the description referring to the terms "one embodiment", "some embodiments", "illustrative embodiments", "examples", "specific examples" or "some examples" means that the specific features, structures, materials or characteristics described in connection with the embodiment or example are included in at least one embodiment or example of the present disclosure. In this specification, the schematic expressions of the above terms do not necessarily refer to the same embodiment or example. Furthermore, the specific features, structures, materials or characteristics which are described may be combined in any one or more embodiments or examples in a suitable manner.

Embodiment 1

A person re-identification method is provided, comprising:

acquiring an image to be identified and a image-library image;

extracting the image to be identified and the image-library image by using a pre-trained person re-identification network model, respectively, to obtain the person feature of the image to be identified and the person feature of the image-library image;

matching the similarity between the person feature of the image to be identified and the person feature of the image-library image, and outputting the person images with the top N similarity as the person re-identification result;

wherein the method for constructing the person re-identification network model comprises:

constructing a person re-identification network, which comprises a backbone network, an improved global feature branch and a ladder-shaped local feature extraction branch guided by a block weight; wherein the backbone network is Resnet50, and a pre-training weight is loaded; the improved global feature branch is connected to the backbone network Conv5_x, comprises a channel attention module, a multi-receptive field integrating module, a GeM pooling layer and a fully connected layer, and is configured to extract the person global feature; after being connected to the backbone network Conv4_x, the ladder-shaped local feature extraction branch guided by the block weight comprises a ladder block layer, a pooling layer, a spatial attention module and a fully connected layer, and is configured to extract the person local feature; the person global feature and the person local feature are connected as the final person features;

using a public data set to train the person re-identification network, and obtaining the trained person re-identification network model.

In some embodiments, the method of constructing the improved global feature branch comprises:

taking the feature map obtained from the backbone network Conv5_x as input, first, extracting significant person information by the channel attention module, then, acquiring the feature information of persons under different receptive fields by the multi-receptive field integrating module for integration, and then performing GeM pooling by a GeM pooling layer to obtain the 2048-dimensional feature vector, using the triplet loss with hard sample mining constraint, and at the same time, connecting the feature vector to the fully connected layer for dimension reduction to obtain the 512-dimensional global feature, using a cross-entropy loss constraint, and using the triple loss and the cross-entropy loss for joint optimization training.

Further, in the channel attention module, the input feature map uses maximum pooling and average pooling at the same time to obtain two one-dimensional vectors, the one-dimensional vectors are then sent to a multi-layer perceptron with shared weights, and the outputs are added element by element and then are activated by Sigmoid to obtain corresponding attention weights;

the formula of the GeM pooling layer is:

$$f = [f_1 \ \ldots \ f_k \ \ldots \ f_K]^T, f_k = \left(\frac{1}{|X_k|} \sum_{x \in X_k} x^{p_k}\right)^{\frac{1}{p_k}}$$

where X is the input of the GeM pooling layer, f is the output of the GeM pooling layer, and $p_k$ is a hyperparameter, which is learned in the process of back propagation;

the multi-receptive field integrating module comprises three branches, convolution operation is performed on the input feature X by branches with the convolution kernel size of 3×3 and the dilation rate of 1, 2 and 3, respectively, to obtain three feature maps, and the three feature maps are integrated into the final output $X^1$.

In some embodiments, the method of constructing the ladder-shaped local feature extraction branch guided by the block weight comprises:

taking the feature map obtained through the backbone network Conv4_x as input, obtaining nine local feature maps through a ladder block layer, performing pooling operation on nine local feature maps to obtain nine 1024-dimensional feature vectors, and then obtaining nine 256-dimensional feature vectors through dimension reduction through the first fully connected layer, and using the cross-entropy loss for classification learning after sending all feature vectors reduced to 256 dimensions to a second fully connected layer, respectively;

at the same time, taking the feature map obtained by the backbone network Conv4_x as input, and obtaining nine spatial attention weight blocks after the spatial attention module and the ladder block layer, where a block weight is computed for each block and the block weight is used to guide the cross-entropy loss.

Further, the ladder block layer first divides the original complete person image feature into 12 horizontal blocks evenly, a first block is used as the initial block, every four blocks are used as a whole as a local area, the initial block is then changed downward with a step size of 1 for ladder-shaped blocking, and finally nine local feature maps are obtained.

For the spatial attention module, first, in the channel attention module, the input H×W×C features are subjected to maximum pooling and average pooling of one channel dimension to obtain two channel descriptions of H×W×1, and the two channel descriptions are spliced together according to the channel; thereafter, through a 7×7 convolution layer, the activation function is Sigmoid, and the spatial attention weight coefficient of H×W×1 is obtained;

the block weight calculation method comprises: sending the spatial attention weight coefficient of H×W×1 output by the spatial attention module into a ladder block layer to obtain nine local coefficient blocks, and dividing the coefficient sum of each local coefficient block by the coefficient sum of nine coefficient blocks to obtain nine block weights.

In some embodiments, the person re-identification network model is trained using double-branch joint training, and the joint training loss function is $L_{total}=L_{global}+L_{local}$, where $L_{global}$ represents the improved global feature branch loss, and $L_{local}$ represents the ladder-shaped local feature branch loss guided by the block weight.

Further, the improved global feature branch loss is $L_{global}=L_{Softmax}+L_{tri\_hard}$, where $L_{Softmax}$ is the cross-entropy loss, and $L_{tri\_hard}$ is the triplet loss with hard sample mining, $$L_{Soft\max} = -\sum_{i=1}^{N} \lg \frac{\exp(W_{y_i}^T f_i + b_{y_i})}{\sum_{k=1}^{H} \exp(W_k^T f_i + b_k)}$$

where N is the number of batches, H is the number of persons, fi is the feature vector of image i, the real label thereof is $y_i$, W is the weight, and b is the offset; $W_k^T$ is the transposition of the weight vector of the kth person, and bk is the offset vector of the kth person;

$$L_{tri\_hard} = \frac{1}{P \times K} \sum_{a \in batch} \left( \max_{pos \in A} d_{an,pos} - \min_{neg \in B} d_{an,neg} d_{an,neg} + m\,ar \right)_+$$

the triplet loss with hard sample mining is used for training, the triple loss function selects an anchor point an, a positive sample pos and a negative sample neg to form a triple, during training, each batch contains P persons, each person has K images, all triples are from P×K images, and the triple loss is calculated by calculating the Euclidean distance to find the positive sample farthest from the anchor point and the negative sample closest to the anchor point, where mar is the set hyper-parameter, $d_{an,pos}$ is the distance between the anchor point and the positive sample, $d_{an,neg}$ is the distance between the anchor point and the negative sample, A and B represent different sample sets in the P×K images, that is, the positive sample and the negative sample which are selected do not coincide;

and minimizing the loss function means maximizing the distance between the anchor point and the negative sample and minimizing the distance between the anchor point and the positive sample.

Further, the ladder-shaped local feature branch loss guided by the block weight is as follows:

$$L_{local} = \Sigma_{i=1}^{n} W_i L_{Softmax\_i}$$

where n is the number of local feature blocks, $L_{Softmax\_i}$ represents the cross-entropy loss of the ith local feature map, and $W_i$ is the block weight of the ith local feature map.

In some embodiments, a person re-identification method of integrating global features and ladder-shaped local features guided by the block weight is provided, comprising the following steps.

Figure 1:
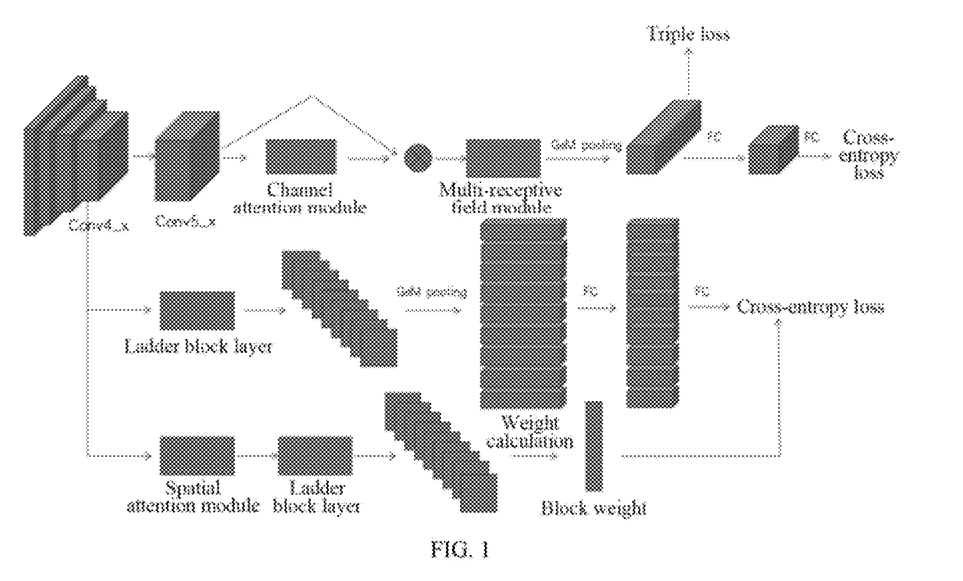
FIG. 1 is a frame diagram of a person re-identification network according to an embodiment of the present disclosure.

Step 1. A person re-identification network is constructed, which comprises a backbone network, an improved global feature branch and a ladder-shaped local feature extraction branch guided by a block weight, as shown in FIG. 1.

In this embodiment, the backbone network resnet50 is divided into five layers, wherein the stride of the last convolution layer is set from 2 to 1, so that the feature maps sampled by Conv4_x and Conv5_x have the same size.

In this embodiment, a double-branch network is used for joint training, in which the global feature branch comprises a channel attention module, a multi-receptive field integrating module, a GeM pooling layer and an FC layer; the local feature branch guided by the block weight comprises a ladder block layer, a GeM pooling layer, a spatial attention module and an FC layer. The joint training formula is $L_{local} = L_{global} + L_{local}$, where $L_{global}$ represents the improved global feature branch loss, and $L_{local}$ represents the ladder-shaped local feature branch loss guided by the block weight.

In this embodiment, the global feature branch loss is $L_{global} = L_{Softmax} + L_{tri\_hard}$, where $L_{Softmax}$ is the cross-entropy loss, and $L_{tri\_hard}$ is the triplet loss with hard sample mining. Two formulas are introduced, respectively:

$$L_{Softmax} = -\sum_{i=1}^{N} \lg \frac{\exp(W_{y_i}^T f_i + b_{y_i})}{\sum_{k=1}^{H} \exp(W_k^T f_i + b_k)}$$

where N is the number of batches, H is the number of persons, fi is the feature vector of image i, the real label thereof is $y_i$, W is the weight, and b is the offset; $W_k^T$ is the transposition of the weight vector of the kth person, and bk is the offset vector of the kth person;

$$L_{tri\_hard} = \frac{1}{P \times K} \sum_{a \in batch} \left( \max_{pos \in A} d_{an,pos} - \min_{neg \in B} d_{an,neg} d_{an,neg} + mar \right)_+$$

the triplet loss with hard sample mining is used for training, the triple loss function selects an anchor point an, a positive sample pos and a negative sample neg to form a triple, during training, each batch contains P persons, each person has K images, all triples are from P×K images, and the triple loss is calculated by calculating the Euclidean distance to find the positive sample farthest from the anchor point and the negative sample closest to the anchor point, where mar is the set hyper-parameter, $d_{an,pos}$ is the distance between the anchor point and the positive sample, $d_{an,neg}$ is the distance between the anchor point and the negative sample, A and B represent different sample sets in the P×K images, that is, the positive sample and the negative sample which are selected do not coincide; and minimizing the loss function means maximizing the distance between the anchor point and the negative sample and minimizing the distance between the anchor point and the positive sample.

In this embodiment, the local branch training formula is as follows:

$$L_{local} = \Sigma_{i=1}^{n} W_i L_{Softmax\_i}$$

where n is the number of local feature blocks, $L_{Softmax\_i}$ represents the cross-entropy loss of the ith local feature map, and $W_i$ is the block weight of the ith local feature map. In this embodiment, n=9.

Figure 2:
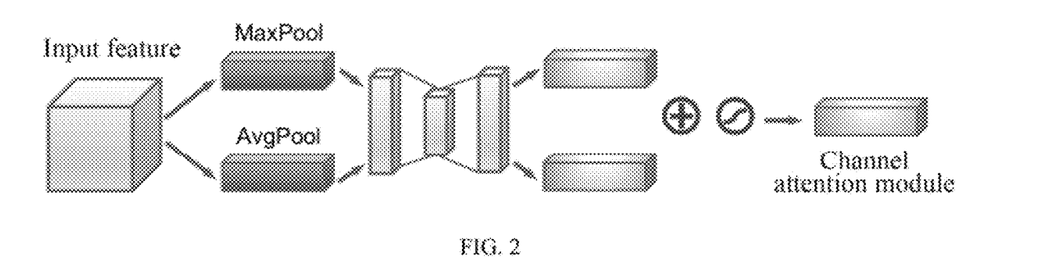
FIG. 2 is a schematic diagram of a channel attention module according to an embodiment of the present disclosure.

In this embodiment, the channel attention module is shown in FIG. 2. In the channel attention module, the input feature map uses maximum pooling and average pooling at the same time to obtain two one-dimensional vectors, the one-dimensional vectors are then sent to a multi-layer perceptron with shared weights, and the outputs are added element by element and then are activated by Sigmoid to obtain corresponding attention weights.

Figure 3:
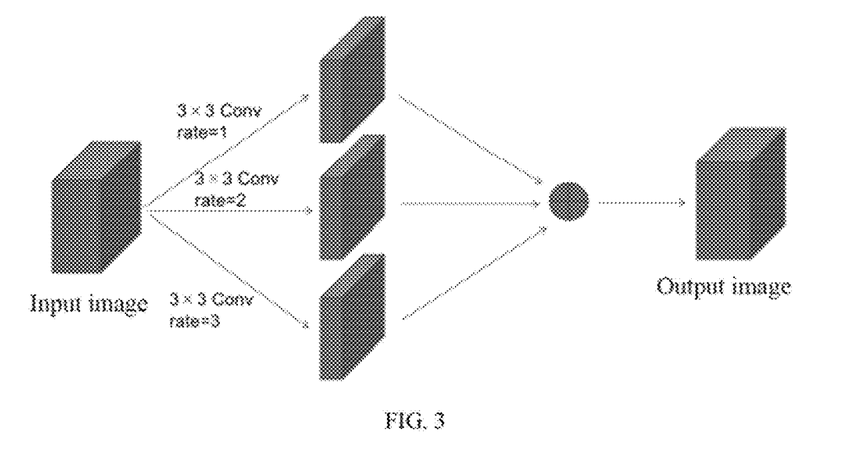
FIG. 3 is a schematic diagram of a multi-receptive field integrating module according to an embodiment of the present disclosure.

In this embodiment, the multi-receptive field integrating module comprises three branches, convolution operation is performed on the input feature X by branches with the convolution kernel size of 3×3 and the dilation rate of 1, 2 and 3, respectively, to obtain three feature maps, and the three feature maps are integrated into the final output $X^1$.

In this embodiment, the pooling formula of the GeM pooling layer is as follows:

$$f = [f_1 \ \ldots \ f_k \ \ldots \ f_K]^T, f_k = \left( \frac{1}{|X_k|} \sum_{x \in X_k} x^{p_k} \right)^{\frac{1}{p_k}}$$

where X is the input of the GeM pooling layer, f is the output of the GeM pooling layer, and $p_k$ is a hyper-parameter, which is learned in the process of back propagation.

In this embodiment, the ladder block layer first divides the original complete person image feature into 12 horizontal blocks evenly, a first block is used as the initial block, every four blocks are used as a whole as a local area, the initial block is then changed downward with a step size of 1 for ladder-shaped blocking, and finally nine local feature maps are obtained.

Figure 4:
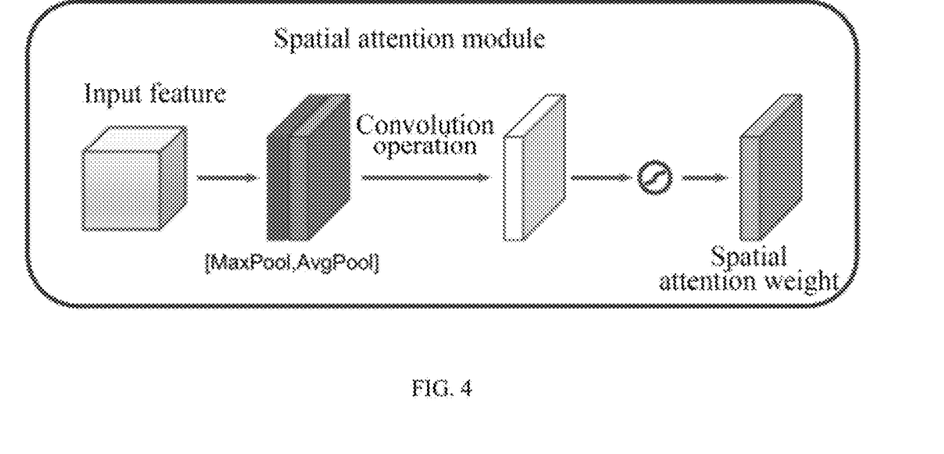
FIG. 4 is a schematic diagram of a spatial attention module according to an embodiment of the present disclosure.

In this embodiment, the spatial attention module first performs maximum pooling and average pooling of one channel dimension on the H×W-C features output by Conv4_x to obtain two channel descriptions of H×W×1, and the two channel descriptions are spliced together according to the channel, thereafter, through a 7×7 convolution layer, the activation function is Sigmoid, and the spatial attention weight coefficient of H×W×1 is obtained.

In this embodiment, the spatial attention weight coefficient using H×W×1 is sent into the ladder block layer to obtain nine local coefficient blocks, and the coefficient sum of each coefficient block is divided by the coefficient sum of nine coefficient blocks to obtain nine block weights.

Step 2. The person re-identification network is trained to obtain the trained person re-identification network model.

The training data is acquired from a public data source and is preprocessed. The preprocessed image data is divided into a training set and a testing set. The training set is sent into a person re-identification network for training to obtain a trained person re-identification network. The trained person re-identification network is tested through the test set. If the preset requirements are satisfied, training stops, so as to obtain the trained person re-identification network, otherwise, the training process continues.

In this embodiment, the data comes from several public data sets, such as Market1501, DukeMTMC Reid and MSMT17. The images extracted from the data set are preprocessed by preprocessing methods such as horizontal flipping and random erasing.

In this embodiment, an input person image with a given size of H×W×3 is first adjusted to an image size of 384×128×3, and then the input image is preprocessed by the methods such as random erasing, image flipping, etc.

In this embodiment, the loss function is used to measure the prediction ability of a deep learning model, and the loss function is used to supervise the training process of the model, so as to narrow the gap between the real value and the predicted value.

First, for a person image with a given size of 384×128×3, the initial feature map is obtained through the backbone network ResNet50.

The features output by the backbone networks Conv4_x and Conv5_x are sent to the local branch and the global branch, respectively, for further feature extraction.

For the global branch, the feature map with the channel number of 2048 is input. The channel attention module calculates the channel attention weight coefficient multiplied by the weight to obtain the feature with an attention weight. The channel number of the output feature map is still 2048.

The feature with an attention weight is input into the multi-receptive field integrating module. Convolution operation is performed on the input feature X by branches with the convolution kernel size of 3×3, the convolution kernel number of 2048 and the dilation rate of 1, 2 and 3, respectively, to obtain three feature maps. The three feature maps have the same size and the channel number of 2048. These three feature maps are added and integrated into the final output.

GeM pooling is performed on the 2048-dimensional feature map to obtain the feature vector of 1×1×2048 which is constrained by the triple loss. At the same time, the feature vector is connected to the fully connected layer for dimension reduction to obtain the 512-dimensional feature vector. After being sent to the fully connected layer, the feature vector is classified and studied by using the cross-entropy loss with smooth labels, and the triple loss and cross-entropy loss are used for joint optimization training.

For the local branch, the feature map with the channel number of 1024 is input. Nine local feature maps are obtained through the ladder block layer. Pooling operation is performed on the nine local feature maps to obtain nine 1024-dimensional feature vectors, and then nine 256-dimensional feature vectors are obtained through dimension reduction through the first fully connected layer. The cross-entropy loss is used for classification learning after sending all feature vectors reduced to 256 dimensions to the fully connected layer, respectively. At the same time, the calculated block weight is multiplied by the cross-entropy loss of each local feature map, and the results are added to obtain the final local branch loss.

In the training stage, the joint training method of the local branch and the global branch is used. The training formula is $L_{total}=L_{global}+L_{local}$, and the training stops until the total loss value $L_{total}$ is the minimum.

Step 3. The person feature of the image to be identified is extracted by a training model, the extracted feature is matched with the feature corresponding to each image in the gallery, and the top N person images is output according to the similarity with the image to be identified.

The feature vector of the global branch reduced to 512 dimensions and nine 256-dimensional feature vectors of the local branch are connected as the final feature. By calculating the cosine similarity between the query image and the images in the image database, the model performance evaluation results mAP, rank-1, rank-5 and rank-10 are obtained.

Embodiment 2

In a second aspect, this embodiment provides a person re-identification device, comprising a processor and a storage medium;
wherein the storage medium is configured to store instructions;
the processor is configured to operate according to the instructions to perform the steps of the method according to Embodiment 1.

Embodiment 3

In a third aspect, this embodiment provides a storage medium on which a computer program is stored, wherein the computer program, when executed by a processor, implements the steps of the method according to Embodiment 1.

It should be understood by those skilled in the art that the embodiments of the present disclosure can be provided as methods, systems, or computer program products. Therefore, the present disclosure can take the form of an entirely hardware embodiment, an entirely software embodiment, or an embodiment combining software and hardware. Furthermore, the present disclosure may take the form of a computer program product implemented on one or more computer-available storage media (including but not limited to a disk storage, CD-ROM, an optical storage, etc.) in which computer-available program codes are contained.

The present disclosure is described with reference to flowcharts and/or block diagrams of methods, devices (systems), and computer program products according to the embodiments of the present disclosure. It should be understood that each flow and/or block in flowcharts and/or block diagrams and combinations of flows and/or blocks in flowcharts and/or block diagrams can be implemented by computer program instructions. These computer program instructions may be provided to the processor of a general-purpose computer, a special-purpose computer, an embedded processor or other programmable data processing devices to produce a machine, so that the instructions executed by the processor of the computer or other programmable data processing devices produce a device for implementing the functions specified in one or more flows in flowcharts and/or one or more blocks in block diagrams.

These computer program instructions can also be stored in a computer-readable memory that can direct a computer or other programmable data processing devices to work in a specific way, so that the instructions stored in the computer-readable memory produce an article of manufacture including an instruction device that implement the functions specified in one or more flows in flowcharts and/or one or more blocks in block diagrams.

These computer program instructions can also be loaded on a computer or other programmable data processing devices, so that a series of operation steps are executed on the computer or other programmable devices to produce a computer-implemented process, so that the instructions executed on the computer or other programmable devices provide steps for implementing the functions specified in one or more flows in flowcharts and/or one or more blocks in block diagrams.

The above are only the preferred embodiments of the present disclosure. It should be pointed out that for those skilled in the art, several improvements and modifications can be made without departing from the principle of the present disclosure, and these improvements and modifications should also be regarded as the protection scope of the present disclosure.

What is claimed is:

1. A person re-identification method, comprising:
acquiring an image to be identified and a image-library image;
extracting the image to be identified and the image-library image by using a pre-trained person re-identification network model, respectively, to obtain the person feature of the image to be identified and the person feature of the image-library image;
matching the similarity between the person feature of the image to be identified and the person feature of the image-library image, and outputting the person images with the top N similarity as the person re-identification result;
wherein the method for constructing the person re-identification network model comprises:
constructing a person re-identification network, which comprises a backbone network, an improved global feature branch and a ladder-shaped local feature extraction branch guided by a block weight; wherein the backbone network is Resnet50, and a pre-training weight is loaded; the improved global feature branch is connected to the backbone network Conv5_x, comprises a channel attention module, a multi-receptive field integrating module, a GeM pooling layer and a fully connected layer, and is configured to extract the person global feature; after being connected to the backbone network Conv4_x, the ladder-shaped local feature extraction branch guided by the block weight comprises a ladder block layer, a pooling layer, a spatial attention module and a fully connected layer, and is configured to extract the person local feature; the person global feature and the person local feature are connected as the final person features;
using a public data set to train the person re-identification network, and obtaining the trained person re-identification network model.

2. The person re-identification method according to claim 1, wherein the method of constructing the improved global feature branch comprises:
taking the feature map obtained from the backbone network Conv5_x as input, first, extracting significant person information by the channel attention module, then, acquiring the feature information of persons under different receptive fields by the multi-receptive field integrating module for integration, and then performing GeM pooling by a GeM pooling layer to obtain the 2048-dimensional feature vector, using the triplet loss with hard sample mining constraint, and at the same time, connecting the feature vector to the fully connected layer for dimension reduction to obtain the 512-dimensional global feature, using a cross-entropy loss constraint, and using the triple loss and the cross-entropy loss for joint optimization training.

3. The person re-identification method according to claim 1, wherein in the channel attention module, the input feature map uses maximum pooling and average pooling at the same time to obtain two one-dimensional vectors, the one-dimensional vectors are then sent to a multi-layer perceptron with shared weights, and the outputs are added element by element and then are activated by Sigmoid to obtain corresponding attention weights:

and/or, the formula of the GeM pooling layer is:

$$f = [f_1 \ldots f_k \ldots f_K]^T, f_k = \left(\frac{1}{|X_k|}\sum_{x \in X_k} x^{p_k}\right)^{\frac{1}{p_k}}$$

where X is the input of the GeM pooling layer, f is the output of the GeM pooling layer, and $p_k$ is a hyperparameter, which is learned in the process of back propagation;

and/or, the multi-receptive field integrating module comprises three branches, convolution operation is performed on the input feature X by branches with the convolution kernel size of 3×3 and the dilation rate of 1, 2 and 3, respectively, to obtain three feature maps, and the three feature maps are integrated into the final output $X^1$.

4. The person re-identification method according to claim 1, wherein the method of constructing the ladder-shaped local feature extraction branch guided by the block weight comprises:
taking the feature map obtained through the backbone network Conv4_x as input, obtaining nine local feature maps through a ladder block layer, performing pooling operation on nine local feature maps to obtain nine 1024-dimensional feature vectors, and then obtaining nine 256-dimensional feature vectors through dimension reduction through the first fully connected layer, and using the cross-entropy loss for classification learning after sending all feature vectors reduced to 256 dimensions to a second fully connected layer, respectively;
at the same time, taking the feature map obtained by the backbone network Conv4_x as input, and obtaining nine spatial attention weight blocks after the spatial attention module and the ladder block layer, wherein a block weight is computed for each block and the block weight is used to guide the cross-entropy loss.

5. The person re-identification method according to claim 1, wherein the ladder block layer first divides the original complete person image feature into 12 horizontal blocks evenly, a first block is used as the initial block, every four blocks are used as a whole as a local area, the initial block is then changed downward with a step size of 1 for ladder-shaped blocking, and finally nine local feature maps are obtained.

6. The person re-identification method according to claim 4, wherein for the spatial attention module, first, in the channel attention module, the input H×W×C features are subjected to maximum pooling and average pooling of one channel dimension to obtain two channel descriptions of H×W×1, and the two channel descriptions are spliced together according to the channel; thereafter, through a 7×7 convolution layer, the activation function is Sigmoid, and the spatial attention weight coefficient of H×W×1 is obtained;
the block weight calculation method comprises: sending the spatial attention weight coefficient of H×W×1 output by the spatial attention module into a ladder block layer to obtain nine local coefficient blocks, and dividing the coefficient sum of each local coefficient block by the coefficient sum of nine coefficient blocks to obtain nine block weights.

7. The person re-identification method according to claim 1, wherein the person re-identification network model is trained using double-branch joint training, and the joint training loss function is $L_{total}=L_{global}+L_{local}$, where $L_{global}$ represents the improved global feature branch loss, and $L_{local}$ represents the ladder-shaped local feature branch loss guided by the block weight.

8. The person re-identification method according to claim 7, wherein the improved global feature branch loss is $L_{total}=L_{Softmax}+L_{tri\_hard}$, where $L_{Softmax}$ is the cross-entropy loss, and $L_{tri\_hard}$ is the triplet loss with hard sample mining, $$L_{Softmax} = -\sum_{i=1}^{N} \lg \frac{\exp(W_{y_i}^T f_i + b_{y_i})}{\sum_{k=1}^{H} \exp(W_k^T f_i + b_k)}$$

where N is the number of batches, H is the number of persons, fi is the feature vector of image i, the real label thereof is $y_i$, W is the weight, and b is the offset; $W_k^T$ is the transposition of the weight vector of the kth person, and bk is the offset vector of the kth person;

$$L_{tri\_hard} = \frac{1}{P \times K} \sum_{a \in batch} \left( \max_{pos \in A} d_{an,pos} - \min_{neg \in B} d_{an,neg} d_{an,neg} + mar \right)_+$$

the triplet loss with hard sample mining is used for training, the triple loss function selects an anchor point an, a positive sample pos and a negative sample neg to form a triple, during training, each batch contains P persons, each person has K images, all triples are from P×K images, and the triple loss is calculated by calculating the Euclidean distance to find the positive sample farthest from the anchor point and the negative sample closest to the anchor point, where mar is the set hyper-parameter, $d_{an,pos}$ is the distance between the anchor point and the positive sample, $d_{an,neg}$ is the distance between the anchor point and the negative sample, A and B represent different sample sets in the P×K images, that is, the positive sample and the negative sample which are selected do not coincide; and minimizing the loss function means maximizing the distance between the anchor point and the negative sample and minimizing the distance between the anchor point and the positive sample.

9. The person re-identification method according to claim 7, wherein the ladder-shaped local feature branch loss guided by the weight is as follows;

$$L_{local} = \sum_{i=1}^{n} W_i L_{Softmax\_i}$$

where n is the number of local feature blocks, $L_{Softmax\_i}$ represents the cross-entropy loss of the ith local feature map, and $W_i$ is the block weight of the ith local feature map.

10. A person re-identification device, comprising a processor and a storage medium;
wherein the storage medium is configured to store instructions;
the processor is configured to operate according to the instructions to perform the steps of the method according to claim 1.

* * * * *